US005852958A

United States Patent [19]

Araki

[11] Patent Number: 5,852,958

[45] Date of Patent: Dec. 29, 1998

[54] DEVICE FOR REMOVING AN END COATING PORTION

[75] Inventor: Yoshihiro Araki, Yokkaichi, Japan

[73] Assignee: Sumitomo Wiring Systems, Ltd., Japan

[21] Appl. No.: 773,682

[22] Filed: Dec. 24, 1996

[30] Foreign Application Priority Data

Dec. 28, 1995 [JP] Japan .................................... 7-343771

[51] Int. Cl.$^{6}$ ...................................................... H02G 1/12

[52] U.S. Cl. ................................................ 81/9.51; 81/9.4

[58] Field of Search ............................ 81/9.4, 9.41, 9.42, 81/9.43, 9.44, 9.51

[56] References Cited

U.S. PATENT DOCUMENTS

| | | | |
|---|---|---|---|
| 2,313,793 | 3/1943 | Wood . | |
| 3,226,815 | 1/1966 | Kelly | 81/9.41 X |
| 3,538,796 | 11/1970 | Metcalf | 81/9.4 |
| 3,880,022 | 4/1975 | Miller | 81/9.4 |
| 4,736,501 | 4/1988 | Fujimoto . | |
| 4,779,328 | 10/1988 | Hasegawa et al. . | |
| 4,932,110 | 6/1990 | Tanaka . | |
| 5,507,207 | 4/1996 | Benoit et al. | 81/9.43 |

FOREIGN PATENT DOCUMENTS

| | | | |
|---|---|---|---|
| 0 137 631 | 4/1985 | European Pat. Off. . | |
| 0 418 789 A1 | 3/1991 | European Pat. Off. . | |
| 36 32 685 A1 | 3/1988 | Germany . | |
| 58-36106 | 3/1983 | Japan . | |
| 0493844 | 11/1975 | U.S.S.R. | 81/9.4 |

*Primary Examiner*—D. S. Meislin

*Attorney, Agent, or Firm*—Anthony J. Casella; Gerald E. Hespos; Ludomir A. Budzyn

[57] ABSTRACT

To facilitate removal of partly peeled end coating portions W2 of insulated wires W, improve operability so as to make it unlikely to strain an operator, and keep the alignment of the ends of the insulated wires W from which the end coating portions W2 are removed. There is provided a retainer member 23 capable of retaining exposed cores W1 of the insulated wires W. Cut faces of coating portions W3 of the insulated wires W from which the end coating portions W2 are to be removed engage the retainer member 23. There is further provided a removal portion 24, 25 for applying a force to the end coating portions W2 in a removal direction between the retainer member 23 and the removal portion 24, 25. The end coating portions W2 are removed from the cores W1 by retaining the exposed cores W1 of the insulated wires W by retainer member 23 and by applying a force to the end coating portions W2 in the removal direction by the removal portion 24, 25.

8 Claims, 6 Drawing Sheets

(A)

(B)

DEVICE FOR REMOVING AN END COATING PORTION

BACKGROUND OF THE INVENTION

1. Field of the Invention

The present invention relates to a device for removing an end coating portion from an insulated wire.

2. Description of the Prior Art

An insulated wire includes a core and an insulation coating surrounding the core. When a terminal is secured to an insulated wire or resistance welding is applied thereto, it is generally necessary to cut the insulation coating at the end of the wire, and to expose the core by removing the cut end coating portion of the insulation coating. However, if the wires are transported or handled in various ways with the cores exposed, the exposed cores may undesirably be loosened or bent.

In view of the above, it is a general practice to partly peel the insulation coating by slightly pulling the end coating portion after the insulation coating is cut. Thus, the end coating portion is not fully removed, but still stays on the wire end while being shifted slightly in an axial direction. This process is referred to as "partial peeling", and is shown in Japanese Unexamined Patent Publication No. 58-36106.

Terminal mounting, welding or other processing is applied to the partly peeled insulated wire after the end coating portion is removed. Such processings include a concentrated splicing for a wiring harness or a sub-assembly (hereafter, "wire assembly") of a wiring harness.

In view of the above problems, it is an object of the invention to provide a device for removing a partially peeled end coating portion of an insulated wire which device has a remarkably improved operability.

SUMMARY OF THE INVENTION

According to the invention, there is provided a device for removing an end coating portion that has been cut from the remaining coating portion of an insulated wire and that has been shifted axially along the core of the insulated wire without being completely removed from the core. The device comprises a removal portion for applying a force to the end coating portion in a removal direction so as to remove the end coating portion.

According to a preferred embodiment of the invention, the device further comprises a retainer member for detachably retaining the exposed core of the insulated wire, while in particular engaging a cut face of the coating portion of the insulated wire from which the end coating portion is to be removed.

The removal portion may comprise an engagement member engageable with a cut face of the end coating portion and/or of the coating portion, and in particular a lever for displacing the engagement member and the retainer member with respect to each other.

The removal portion, in particular the engagement member, may further comprise one or more slits for inserting one or more insulated wires and/or interacting with the end coating portion of the insulated wire. The slits preferably have a width which is substantially equal to or larger than the thickness of the exposed cores of the insulated wires and/or which is preferably smaller than the thickness of the end coating portion. The slit preferably has a length or depth being at least twice the thickness of the coated portion of the insulated wires, wherein the width is preferably variable along or becomes preferably smaller or narrower in an insertion direction of the insulated wire.

Thus the insulated wire can be more easily inserted into the slit and/or insulated wires having different widths can be inserted in the same slit(s), in particular at different depths of the slit(s) (i.e. at different positions along an insertion direction of the insulated wires into the slit).

Most preferably, the retainer member comprises a first member being provided with at least one slit, into which one or more exposed cores of one or more insulated wires are insertable. Preferably the first member is provided with at least two slits having two or more different widths.

According to a further preferred embodiment, the one or more slits of the retainer member are substantially flush with the one or more slits of the removal portion.

The removal portion may be provided with hinge means for movably supporting the removal portion relative to the retainer member. The hinge means preferably comprises a biasing means for biasing the removal portion toward the retainer member.

The hinge means may be arranged at a distance with respect to the removal portion and/or with respect to the retainer member.

The removal portion may comprise an actuating or operation member for actuating the removal portion by hand and/or by an actuating means. The actuating member may be provided at an end of the removal portion opposed to or spaced from the hinge means. The removal portion may further comprise a bent member being formed with at least one slit.

With such a bent portion it is possible to insert insulated wires into the slit(s) having end coated portions of different lengths to be removed, since there is actually no limitation as to the length in the longitudinal direction of the end coated portion to be removed.

Most preferably, the retainer member and the removal portion can be substantially linearly displaced with respect to each other.

According to a preferred embodiment of the invention, there is provided a device for removing an end coating portion cut from a coating portion of an insulated wire. The end coating portion remains on a core of the insulated wire but is shifted axially therealong. The device comprises a retainer member for detachably retaining the exposed core of the insulated wire while, in particular engaging a cut face of the coating portion of the insulated wire from which the end coating portion is to be removed. The device further comprises a removal portion for applying a force to the end coating portion in a removal direction, in particular between the retainer member and the removal portion so as to remove the end coating portion.

In this construction, the retainer member retains the exposed core while engaging the cut face of the coating portion of the insulated wire, and the removal portion applies a force to the end coating portion in the removal direction between the retainer member and the removal portion, with the result that the end coating portion is removed from the core. Since the force acting in the removal direction is applied to the end coating portion while the retainer member engages the cut face of the coating portion of the insulated wire from which the end coating portion is to be removed, the coating portion of the insulated wire having the end coating portion removed is held in position. Further, since the end coating portion of the insulated wire can be removed by applying the force in the removal direction by means of the retainer member and the removal portion, the removal operation can be facilitated.

Preferably, the removal portion comprises an engagement member engageable with a cut face of the end coating portion, and/or a lever for displacing the engagement member and the retainer member with respect to each other.

In this construction, the end coating portion can be removed by more easily applying the force in the removal direction taking advantage of the principle of lever. The "relative displacement" of the retainer member and the engagement member may be such that one member is fixed and the other is displaced, or that both members are displaced.

Thus, the above construction has an advantage of a further improved operability by taking advantage of the principle of lever.

BRIEF DESCRIPTION OF THE DRAWINGS

These and other objects, features and advantages of the present invention will become more apparent upon a reading of the following detailed description and accompanying drawings in which.

DETAILED DESCRIPTION OF THE PREFERRED EMBODIMENTS

Figure 1:
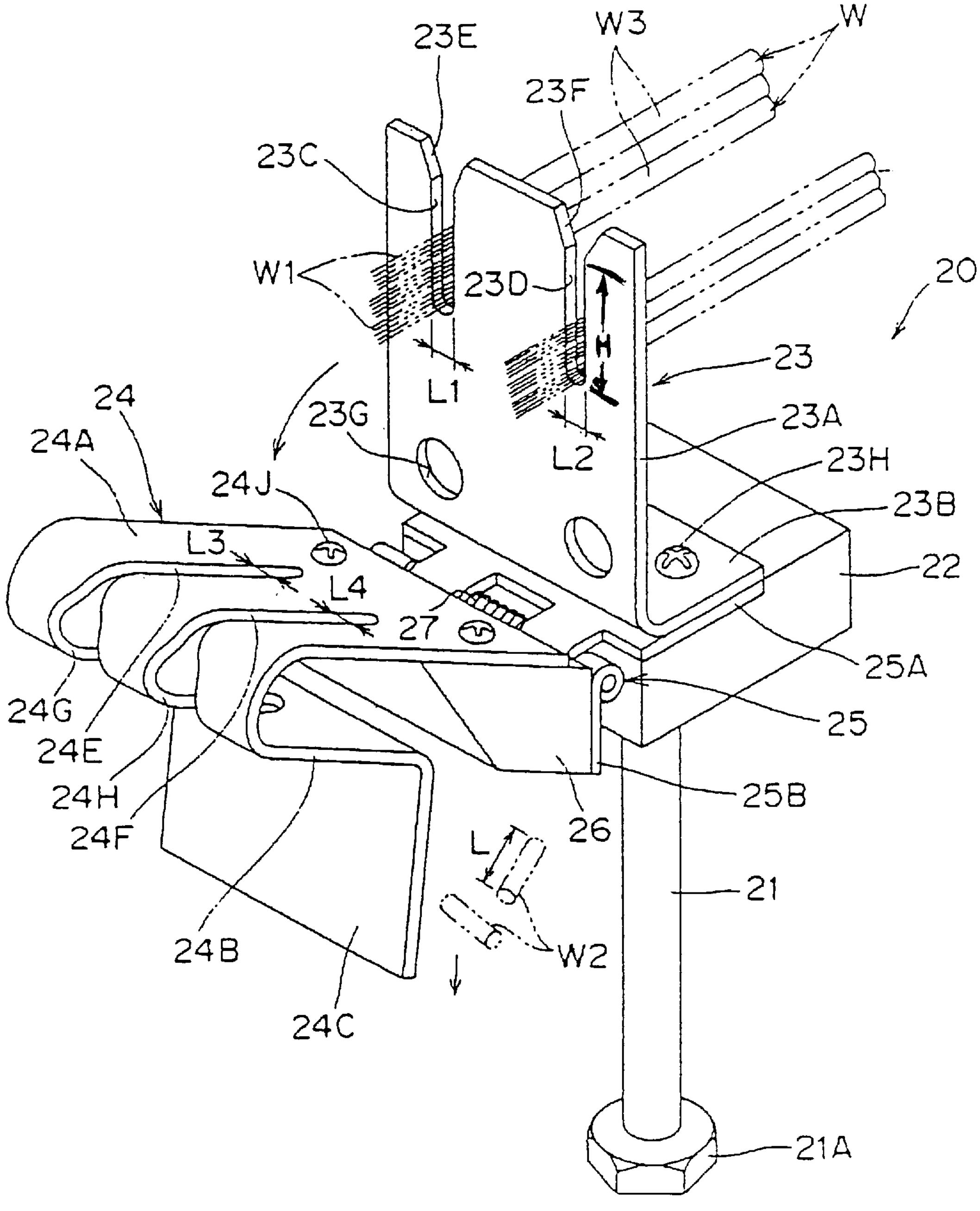
FIG. 1 is a perspective view of an end coating portion removing device according to a first embodiment of the invention in its removal position.
Figure 2:
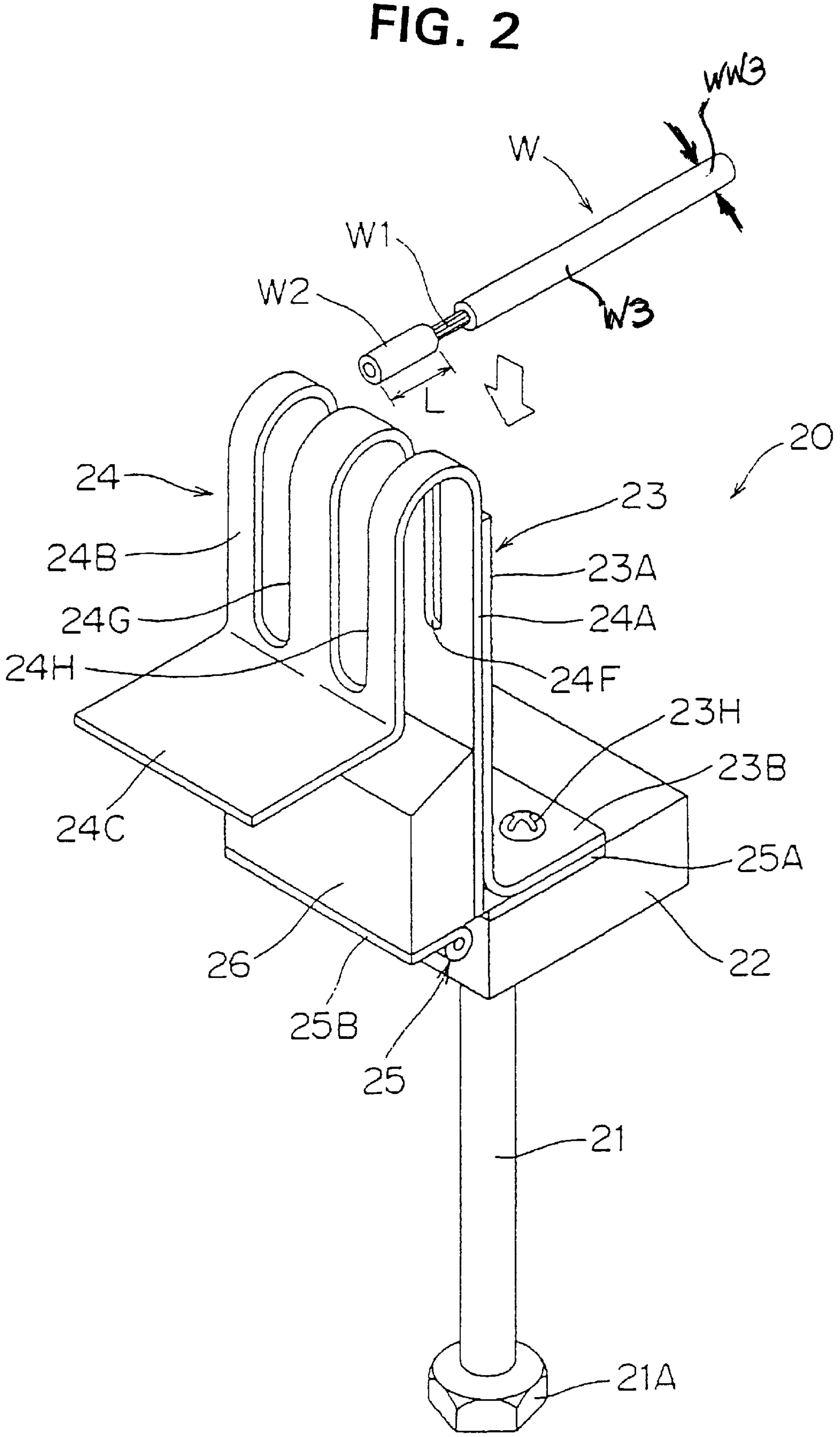
FIG. 2 is a perspective view of the removing device of FIG. 1 in its standby position.

FIGS. 1 and 2 are perspective views of an end coating portion removing device 20 according to a first embodiment of the invention in its removal position and standby position, respectively.

With reference to these FIGS. 1 and 2, the removing device 20 includes a support member 21 standing upright on the work table described with reference to FIG. 5 or the like, a block 22 secured to the top of the support member 21, a fixed plate 23 secured to the upper surface of the block 22, and a movable plate 24 which is movably mounted on the block 22 via a biased hinge 25. The removing device 20 is adapted to easily remove partially peeled end coating portions W2 of insulated wires W as described later.

The support member 21 is formed with an unillustrated externally threaded portion at its bottom, and is secured on the work table by a pair of nuts 21A (only one nut is shown in FIGS. 1 and 2) spirally engageable with the externally threaded portion.

The block 22 forms an essential portion of a support means in cooperation with the biased hinge 25 in the shown embodiment. The block 22 is a metal member substantially in the form of a rectangular parallel piped firmly secured to the top of the support member 21.

The fixed plate 23 is a retainer member for detachably retaining exposed cores W1 of the insulated wires W while engaging the (in particular front) cut faces of coated portions W3 (having a thickness or diameter WW3) of the insulated wires W from which the end coating portions W2 are to be removed in the shown embodiment. The fixed plate 23 is a metal plate member having a substantially L-shaped cross section, and includes a vertically extending first member 23A and a horizontally extending second member 23B.

The first member 23A is formed with two slits 23C, 23D for retaining the cores W1 of the insulated wires W from which the end coating portions W2 are to be removed. The respective slits 23C, 23D are formed with tapered bevelled portions 23E, 23F at their upper opening edges so as to guide the exposed cores W1. Widths L1, L2 of the slits 23C, 23D are preferably different (the slit 23C is wider in the shown embodiment) so as to accept different diameters of the cores W1 of the insulated wire to be processed. The widths L1 and L2 are substantially equal to or greater than the thickness of the exposed cores W1 of the wires W and/or smaller than the thickness WW3 of the partially peeled end coating wires W2. The slits 23C and 23D preferably define heights H at least equal to twice the thickness WW3 of the wires W. Identified by 23G are apertures formed to avoid interference with set screws 24J of the movable plate 24 to be described.

The second member 23B is fastened to a first plate member 25A of the biased hinge 25 by screws 23H. The first member 23A of the fixed plate 23 extends along the vertical direction substantially flush with one end face of the block 22.

The biased hinge 25 supports the respective plates 23, 24 so as to be linearly and/or rotatably displaceable or pivotable with respect to each other between a standby position where the plates 23, 24 abut against each other (see FIG. 2) and a removal position where the plates 23, 24 are spaced apart (see FIG. 1). The movable plate 24 is secured to a second plate member 25B of the biased hinge 25 by being secured to a mount block 26 of resin by the set screws 24J (see FIG. 1). A torsion coil spring 27 of the biased hinge 25 constantly biases the movable plate 24 to hold it in its standby position (FIG. 2).

The movable plate 24 forms an essential portion of a removal portion for removing the end coating portions W2 by applying a force to the end coating portions W2 in a removal direction between the plates 23 and 24. The movable plate 24 includes a removal member 24A which can abut against the first member 23A of the fixed plate 23, a bent member 24B continuous with the upper end of the removal member 24A and bent to have a substantially U-shaped cross section, and a handle member 24C extending at an angle different than 0° or 180°, in particular substantially right angles from the edge of the bent member 24B.

The removal member 24A is formed with two slits 24E, 24F corresponding to the slits 23C, 23D formed in the first member 23A of the fixed plate 23. The respective slits 24E, 24F substantially communicate or are aligned or flush with the corresponding slits 23C, 23D of the fixed plate 23 in the aforementioned standby position (position of FIG. 2), thereby being able to retain the cores W1 of the insulated wires W from which the end coating portions W2 are to be removed. Similar to the slits 23C, 23D, either one of widths L3, L4 of the slits 24E, 24F (slit 24E in the shown embodiment) is set larger than the other so as to conform to the diameters of the cores W1 of the insulated wires W subjected to the removal operation.

The bent member 24B is bent so as to prevent the end coating portions W2 of the insulated wires W from interfering the movable plate 24 in the standby position shown in FIG. 2, and is formed with insertion grooves 24G, 24H communicating the slits 24E, 24F of the removal member 24A. The end coating portions W2 of the insulated wires W are inserted into the insertion grooves 24G, 24H, regardless of their length L, at the side of the movable plate 24 opposite from the fixed plate 23.

In cooperation with the biased hinge 25, the handle member 24C forms a lever in the shown embodiment for manually and relatively displacing the plates 23, 24 between the standby position and the removable position. Although the plates 23, 24 are made relatively displaceable by securing one plate (fixed plate 23) to the block 22 while connecting the other plate (movable plate 24) with the block 22 via the biased hinge 25 in the shown embodiment, the "relative displacement" of the plates 23, 24 is not limited to this. For example, both plates 23, 24 may be displaced.

Next, how the aforementioned construction operates is described.

In the above construction, one insulated wire W or a plurality of insulated wires W are retained in the slits 23C, 24E, 23D, 24F of the plates 23, 24 in the standby position of FIG. 2 by inserting the exposed cores W1 from above. After the insulated wires W are retained, the handle member 24C is operated, e.g. by hand, to bring the plates 23, 24 into the removal position shown in FIG. 1, parting the plates 23, 24. Since the removal member 24A moves the end coating portions W2 in the removal direction in this way, the end coating portions W2 come off the cores W1. Thereafter, the insulated wires W are removed from the fixed plate 23 and the movable plate 24 is returned to its initial standby position.

During this removal operation, by retaining the exposed cores W1 of the insulated wires W in the slits 23C, 24E, 23D, 24F of the plates 23, 24 in the standby position, the movable plate 24 engages the faces of the end coating portions W2 (cut faces in particular rear cut faces) opposite to the coated portions W3, while the end faces of the coated portions W3 of the respective insulated wires W located at the opposite side of the end coating portions W2 are in one plane and in contact with the fixed plate 23. While the movable plate 24 removes the end coating portions W2 by being displaced to the aforementioned removal position, the fixed plate 23 holds the end faces of the coated portions W3 opposite from the end coating portions W2. Accordingly, the ends of the insulated wires W are held in position after the removal of the end coating portions W2. Thus, even if the removal operation is performed for a plurality of insulated wires W, the ends thereof are aligned in order.

Therefore, the above construction remarkably improves operability, is unlikely to strain the operator, and brings about an improved finish of products.

The foregoing embodiment is nothing but the illustration of a preferred specific example of the invention and, thus, the invention is not limited to the foregoing embodiment.

FIGS. 3(A) and 3(B) are a side view partly in section and a plan view of a second embodiment of the invention, respectively.

Figure 3:
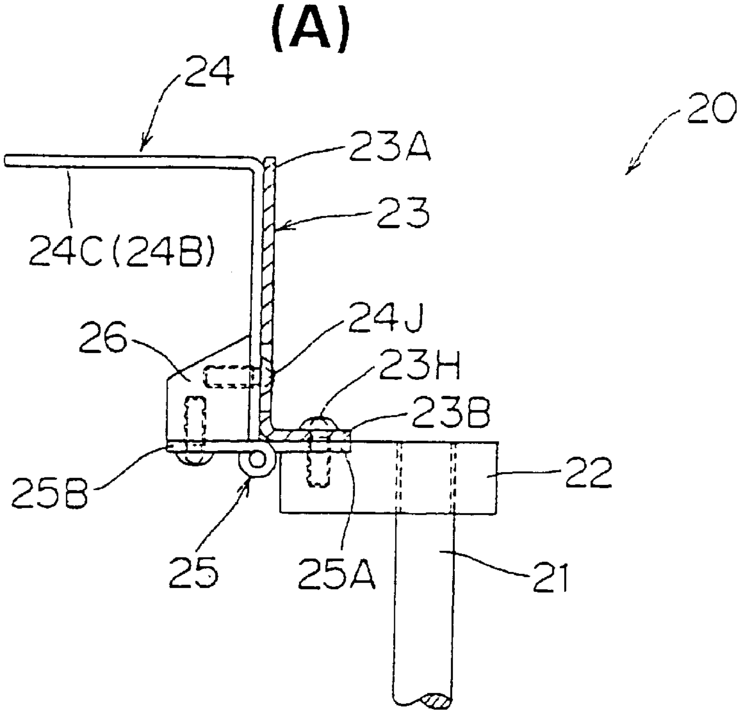
FIG. 3(A) and 3(B) are a side view partly in section and a plan view of a second embodiment of the invention.
Figure 3:
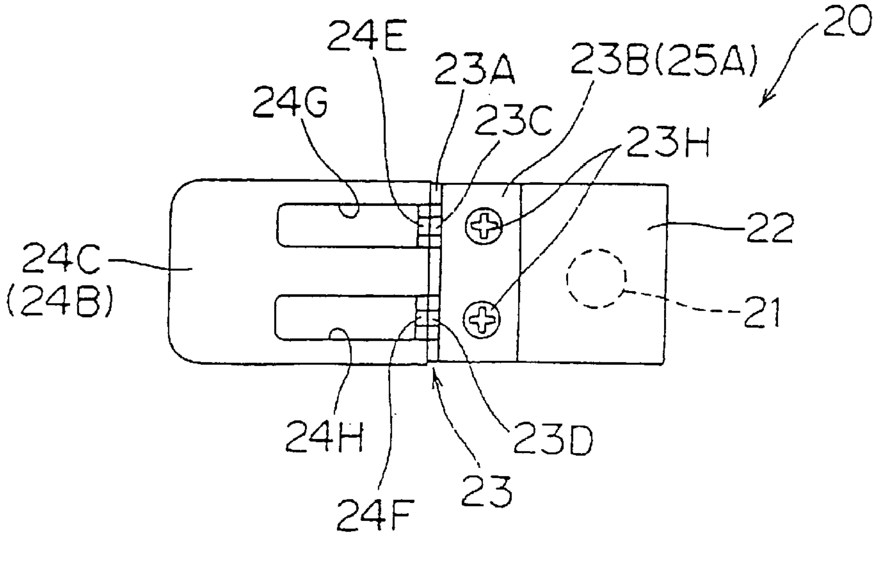

As shown in FIG. 3, in the case that the length L of the end coating portions W2 is short, the movable plate 24 may be formed to have an L-shape and the bent member 24B and the handle member 24C shown in FIGS. 1 and 2 may be made continuous on the same plane.

Figure 4:
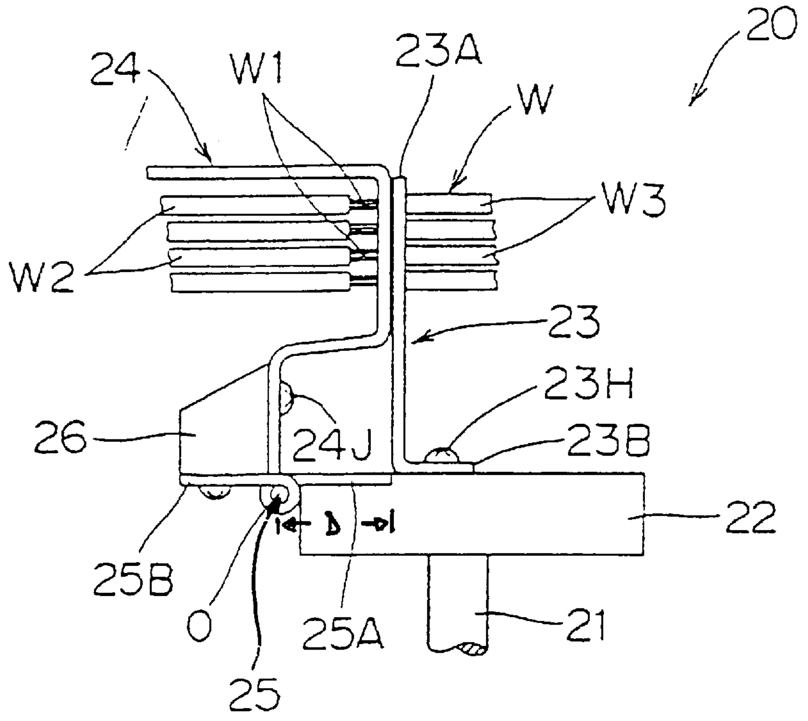
FIG. 4 is a side view of a third embodiment of the invention.

Further, a modification shown in FIG. 4 may be adopted. FIG. 4 is a side view showing a third embodiment of the invention. In the embodiment shown in FIG. 4, a support 0 of the biased hinge 25 is distanced from the fixed plate 23 by a distance D, and the movable plate 24 is so bent as to conform to the distanced support O, thereby realizing a large removal stroke.

Figure 5:
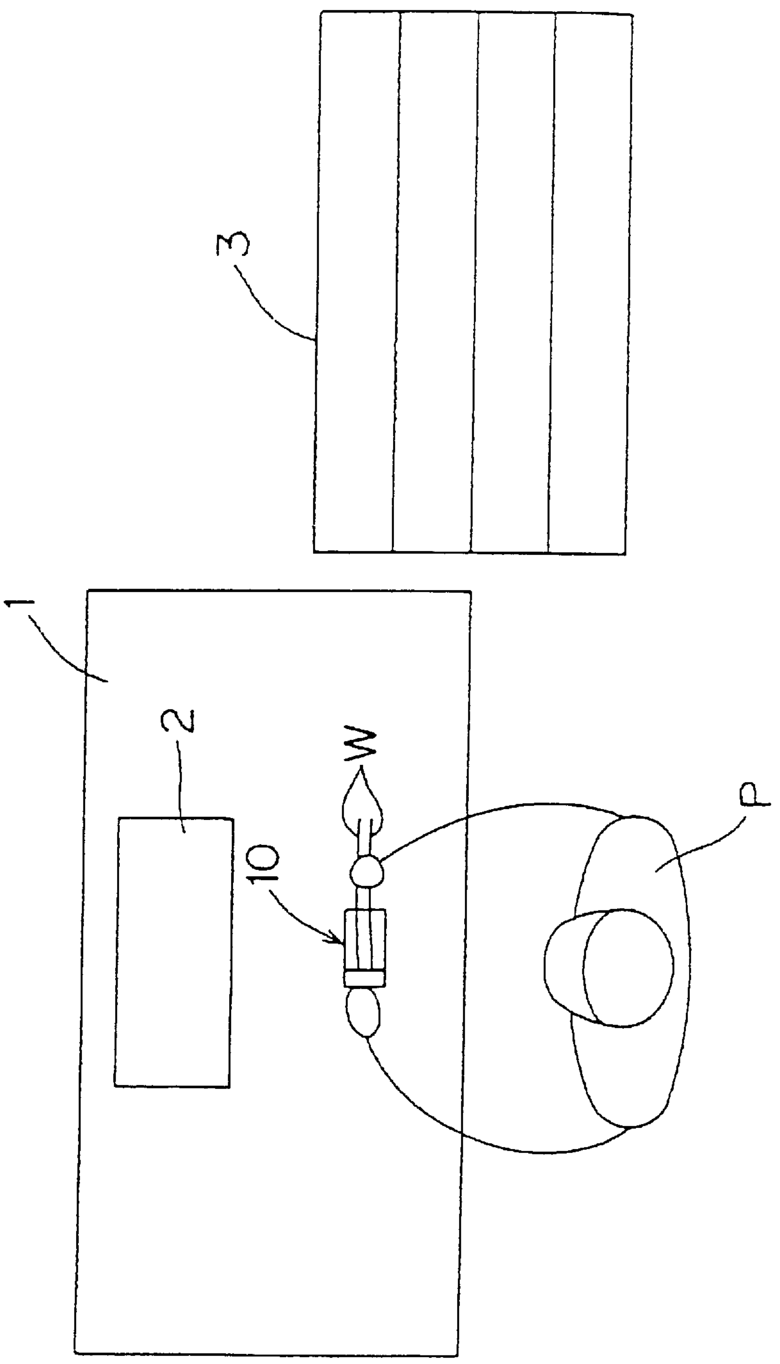
FIG. 5 is a schematic plan view showing a general concentrated slicing station according to a preferred embodiment of the invention for use with an end coating portion removing device of the invention.

FIG. 5 is a schematic plan view of a general concentrated splicing station according to a preferred embodiment of the invention for use with a device 20 (FIGS. 1 to 4) or 10 (FIG. 6) for removing an end coating portion of the invention. With reference to FIG. 5, a work table 1 and a concentrated splicing apparatus (e.g. resistance welding apparatus) 2 are provided in the concentrated splicing station. Identified by 3 is a stock table for stocking wire assemblies to be spliced. An operator P takes a wire assembly from the stock table 3, removes the partially peeled end coating portions of insulated wires, and welds by the resistance welding apparatus 2.

Figure 6:
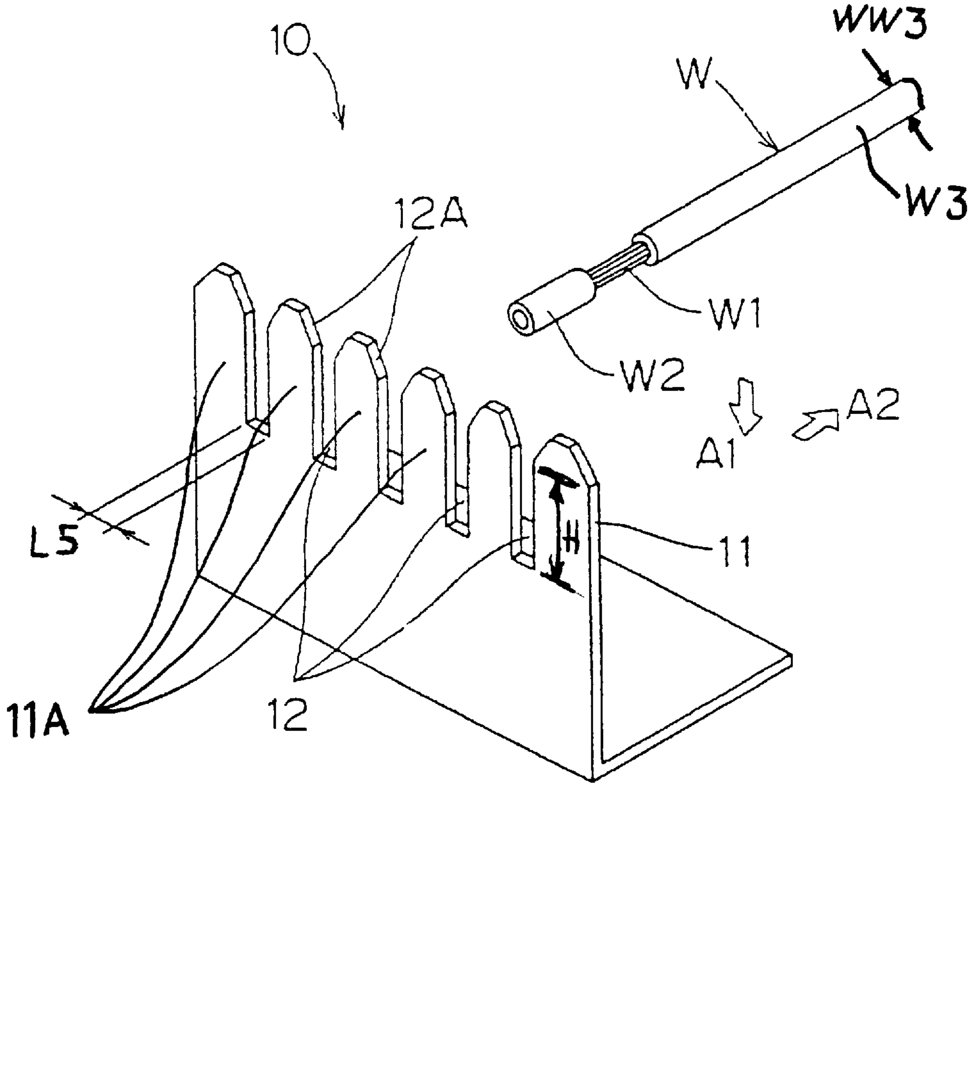
FIG. 6 is a perspective view showing the configuration of an end coating portion removing device according to a fourth embodiment of the present invention.

FIG. 6 is a perspective view showing the configuration of the removing device 10 according to a fourth embodiment of the present invention. With reference to FIG. 6, the removing device 10 is a metal plate member having an L-shaped cross section, and an upright portion 11 thereof acts as a removal portion and is formed with one or more slits 12 opening upward, wherein the one or more slits 12 substantially form or define at lateral sides thereof or therebetween two or more removal members 11A. The slits 12 preferably have different widths L5 so as to conform to different types of insulated wires W, and heights H which exceed the thickness WW3 of the wires W. Bevelled portions 12A are formed at upper opening edges of the slits 12.

In this construction, the end coating portions W2 are removed by inserting exposed cores W1 of a plurality of partially peeled insulated wires W (only one wire is shown in FIG. 6) into the corresponding slits 12 along a direction of an arrow A1 and by pulling the insulated wires W along a direction A2 away from the slits 12.

When the removing device 10 is adopted, operability remarkably improves as compared with the case where the end coating portions are entirely manually removed. The construction of the device 10 is very simple and allows for an easy adaptation to wires of different configurations, in particular thicknesses or diameters.

In a fifth embodiment (not shown) the movable plate is substantially linearly displaceable from the fixed plate along guiding or rail means thus allowing for a particularly long or large removal stroke.

It should be appreciated that a variety of changes are possible within the scope of the invention as defined in claims, e.g. a multitude of pins for defining slits may be used as a stopper member in place of the fixed plate 23, and the hand member 24C may be replaced by an air cylinder.

As described above, the construction according to the invention displays remarkable effects that operability is considerably improved, an operator is unlikely to be strained and the ends of the insulated wires are held in position when the partly peeled end coating portions of the insulated wires are removed.

What is claimed is:

1. A device (10; 20) for removing from an insulated wire (W) an end coating portion (W2) that had previously been cut from remaining coating portions (W3) of the insulated wire (W) and shifted longitudinally on a core (W1) of the insulated wire (W), the coating portions (W2, W3) having coating diameters (WW3), and the core (W1) having a core diameter, said device comprising:

- a support member (21, 22) having opposed first and second ends;
- a fixed plate (23) secured to the second end of the support member (21, 22) and projecting away from the first end of the support member (21, 22), portions of the fixed plate (23) remote from said support member (21, 22) being formed with at least one slit (23C, 23D) defined by non-cutting edges extending toward said support member, said at least one slit (23C, 23D) having a width greater than the core diameter and less than the coating diameter (WW3); and a movable plate (24) for applying a force to the end coating portion (W2) in a removal direction so as to remove the end coating portion (W2), the movable plate (24) being movable from a first position where said movable plate (24) substantially abuts said fixed plate (23) to a second position where said movable plate (24) is spaced from said fixed plate (23), said movable plate having at least one slit (24E, 24F) formed by non-cutting edges disposed to substantially register with said at least one slit (23C, 23D) in said fixed plate (23) when said movable plate (24) is in said first position, said at least one slit (24E, 24F) in said movable plate (24) having a width (L3, L4) greater than the core diameter and less than the coating diameter (WW3), and a handle member (24C) extending from the movable plate (24), said handle member (24C) being actuatable for moving the movable plate (24) into the second position, such that portions of said movable plate (24) adjacent said at least one slit (24E, 24F) remove said end coating portion (W2) from said core (W1).

2. A device according to claim 1, wherein the movable plate (24) is provided with a hinge (25) for movably supporting the movable plate (24) relative to the fixed plate (23), the hinge (25) comprising a spring (27) for biasing the movable plate (24) toward the fixed plate (23).

3. A device according to claim 2, wherein the hinge (25) is arranged at a distance (D) with respect to at least one of the movable plate (24) and the fixed plate (23A).

4. A device according to claim 1, wherein the slits (24E; 24F) have a width (L5; L3; L4) which becomes narrower in an insertion direction (A1) of the insulated wire (W).

5. A device according to claim 4, wherein the slit (24E; 24F) has a length (H) being at least twice the coating diameter (WW3) of the insulated wires (W).

6. A device according to claim 1, wherein the fixed plate (23A) is provided with at least two slits (23C, 23D) having at least two different widths (L1, L2).

7. A device according to claim 1, wherein the first end of the support member (21, 22) is configured for mounting the device (10; 20) to a table (1).

8. A table-mountable device (20) for removing from an insulated wire (W) an end coating portion (W2) that had previously been cut from remaining coating portions (W3) of the wire (W) and shifted longitudinally on a core (W1) of the insulated wire (W), the core (W1) defining a core diameter and the coating (W2, W3) defining a coating diameter (WW3), the table-mountable device comprising:

an elongate support member (21) having opposed first and second ends, said first end having a structure (21A) for secure attachment to a table;

a support block (22) securely mounted to the second end of the support member (21);

a hinge (25) having a first plate (25A) securely mounted to the support block (22) and a second plate (25B) articulated to said first plate for rotation about an axis orthogonal to said support member (21);

a fixed plate (23) secured to said block (22) in proximity to said first plate (25A) of said hinge (25), said fixed plate (23) extending away from said block (22), portions of said fixed plate (23) remote from said block (22) having at least one slit (23C, 23D) defined by non-cutting edges, said slit (23C, 23D) having a width greater than the core diameter and less than the coating diameter (WW3);

a removal portion securely mounted to said second plate (25B) of said hinge (25), said removal portion including a movable plate (24) disposed on said first plate (25B) of said hinge (25) such that in a first rotational orientation of said hinge (25) said movable plate (24) is substantially adjacent said fixed plate (23) and such that, in a second rotational orientation of said hinge (25), said movable plate (24) is spaced from said fixed plate (23), said movable plate (24) having at least one slit (24E, 24F) defined by non-cutting edges disposed to substantially register with the at least one slit (23C, 23D) of the fixed plate (23), the at least one slit (24E, 24F) of said movable plate (24) having a width substantially equal to the respective width of the at least one slit (23C, 23D) of the fixed plate (23), a bent member (24B) extending from portions of said movable plate (24) remote from said hinge (25) and having at least one slit (24G, 24F) extending from the respective at least one slit (24E, 24F) of the movable plate (24), the at least one slit (24G, 24H) in the bent member (24B) being wider than the coating diameter (WW3), and a handle member (24C) extending from said bent member (24B) and spaced from said hinge (25) for rotating the movable plate (24) about the hinge (25); and a spring (27) for biasing the movable plate into the first position relative to the fixed plate (23).

* * * * *